United States Patent

[11] 3,582,207

| [72] | Inventors | David G. Johnson<br>Maplewood;<br>Arthur W. Kutchera, White Bear Lake Township, Ramsey County, both of, Minn. |
|---|---|---|
| [21] | Appl. No. | 759,391 |
| [22] | Filed | Sept. 12, 1968 |
| [45] | Patented | June 1, 1971 |
| [73] | Assignee | Minnesota Mining and Manufacturing Company<br>St. Paul, Minn. |

[54] APPARATUS FOR MAKING MULTIPLE COPIES OF AN IMAGE WEB
15 Claims, 6 Drawing Figs.

[52] U.S. Cl. .................................................. 355/90, 355/106, 355/109
[51] Int. Cl. ........................................................ G03b, 27/08, G03b 27/12
[50] Field of Search .......................................... 355/90, 89, 104, 106, 98, 109, 111, 102, 110

[56] References Cited
UNITED STATES PATENTS

| 1,335,860 | 4/1920 | Shapiro | 355/90 |
| 1,951,299 | 3/1934 | Wagner | 355/90 |

Primary Examiner—Samuel S. Matthews
Assistant Examiner—Richard L. Moses
Attorney—Kinney, Alexander, Sell, Steldt & Delahunt ABSTRACT: Apparatus for simultaneously making multiple copies of an original web in which the original web is guided past an elongated duplicating station in a generally helical path to simultaneously position a plurality of spaced successive portions of the original web at the duplicating station. One duplicating web is guided into intimate contact with each successive portion of the original web at the duplicating station and the original web and the duplicating webs are simultaneously moved to progressively impart information on the original web to the duplicating webs.

INVENTORS
DAVID G. JOHNSON
ARTHUR W. KUTCHERA
BY Kinney, Alexander,
Sell, Steldt & DeLaHunt
ATTORNEYS INVENTORS
DAVID G. JOHNSON
ARTHUR W. KUTCHERA
BY Kinney, Alexander,
Sell, Steldt & De La Hunt
ATTORNEYS INVENTORS
DAVID G. JOHNSON
ARTHUR W. KUTCHERA
BY Kinney, Alexander,
Sell, Steldt & DeLaHunt
ATTORNEYS

APPARATUS FOR MAKING MULTIPLE COPIES OF AN IMAGE WEB

This invention relates to apparatus for duplicating graphic intelligence on an original web and in one aspect relates to an apparatus for photographically producing multiple copies of graphic intelligence on an original film wherein the copy is imaged while in intimate contact with the original.

There is a need for equipment which will make copies of information on one web, particularly information placed thereon photographically which is not easily reproduced except by copying the web, such that the information contained on the original film could be sent to various people without danger of loss or destruction of the original film. Further, it is usual to require multiple copies of a film, particularly when distributing educational materials.

With photographic film it is necessary in accomplishing this result to place the two films in intimate contact and project light through the original film onto the copy or duplicating film to impart thereto a latent developable image corresponding to that on the original film. Contact exposure is also required when copying information on other types of webs, such as when the copy or duplicating web has a thermographic coating. With prior known devices duplication of webs has been accomplished by guiding the original film past a light source and guiding the copy film into intimate contact with the original film, maintaining such position while moving the films past the duplicating station and then separating the films and rewinding them. The copy film, if photographic, was then normally taken to a remote developer or processing unit for development. This practice however accomplishes only the making of a single duplicate during the movement of the entire original from a supply reel to the takeup reel.

It is an advantage of the present invention to produce multiple copies of the original upon one pass of the original from the supply reel to the takeup reel.

It is a further advantage of the present invention to permit multiple duplication in considerably less time without a substantial increase in equipment. The invention also permits rapid production of a number of developed copies from sensitive duplicating films in a time period not substantially greater than that required to make a single copy with presently available equipment.

When utilizing light-sensitive heat-developable films as the duplicating films, the web duplicating equipment constructed in accordance with the present invention is compact, easily threaded for exposing, developing and rewinding a plurality of duplicate films.

The image-web duplicating apparatus of the present invention comprises an elongated duplicating station past which, by means of suitable guide members, the original web or film is directed a plurality of times along spaced paths in moving from a supply supporting member to a rewind member. Additional movable guide members permit easy threading of a plurality of duplicating webs or films from supply members into contact with the original film in a advance of the duplicating to position one duplicating film over the original film each time the original moves along a path past the duplicating station. Other guide members separate each duplicate film from the original film after passing the duplicating station and the duplicating films are preferably directed to a processor to be immediately developed, preferably by heat, cooled and viewed. After development the duplicate films are rewound on separate reels.

The above and other novel features and advantages of the present invention will become more apparent after reading the following description which refers to the accompanying drawings wherein.

Figure 1:
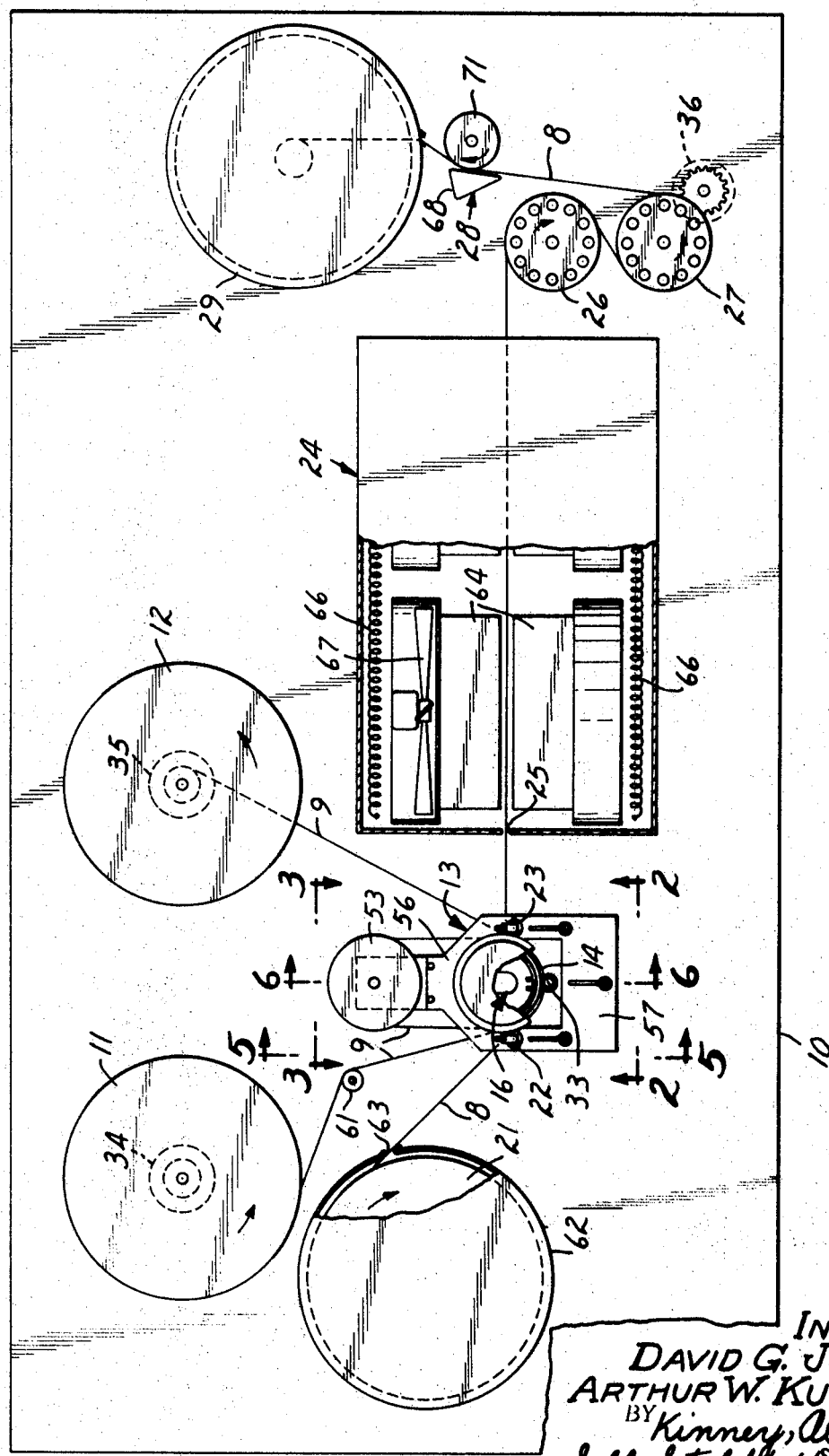
FIG. 1 is a plan view of apparatus made in accordance with the present invention showing the movement of an original film and duplicating films.
Figures 2, 3:
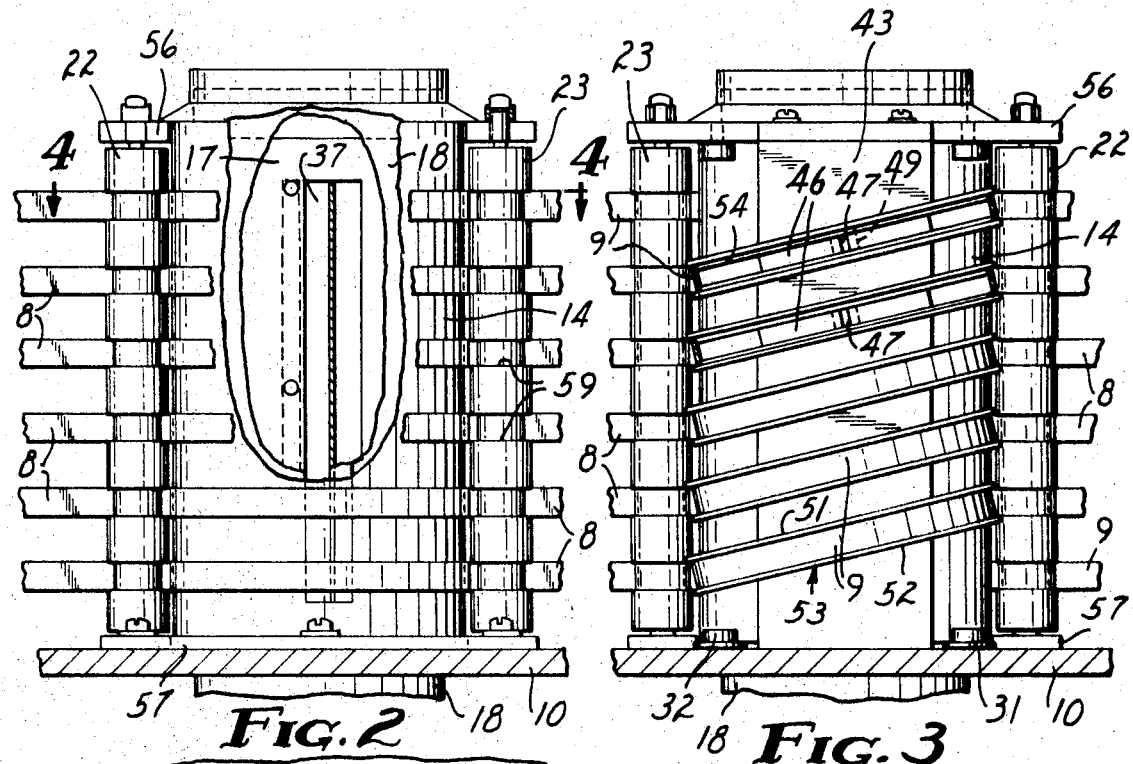
FIG. 2 is a front elevational view, partly in section taken along line 2-2 of FIG. 1.
FIG. 3 is a rear elevational view taken along line 3-3 of FIG. 1.

The apparatus for producing on sensitized duplicating webs or films 8 multiple copies of an original film 9 formed according to the present invention comprises a main support frame or deck 10, an original film storage or supply reel 11; an original film takeup reel 12; a duplicating station 13 comprising a revolvable cylinder 14, a light source 16, a pair of opaque semicylindrical members 17 and 18, and a plurality of original film guide discs 53; a plurality of duplicating film supply reels 21; means for guiding the duplicating films and the original film into register and intimate contact at the duplicating station comprising a pair of film guide rollers 22 and 23; a film processor 24, a duplicating film cooling guide and idling roller 26; a drive capstan 27; a film-viewing station 28; and a plurality of duplicating film takeup reels 29.

The duplicating station 13 is supported on the deck 10 and the revolvable cylinder 14 is a hollow transparent cylinder. The cylinder 14 is rotatably mounted on three bearings 31, 32 and 33 circumferentially spaced about the base of the cylinder and rotatably mounted on the deck 10. The bearings 31, 32, and 33 are preferably spaced 120° apart around the periphery of the cylinder 14 to maintain the axis of the cylinder generally coaxial with the axes of two opaque semicylindrical members 17 and 18. These opaque members 17 and 18 are adjustably supported relative to the deck 10 and are normally fixed to provide an elongated projection slot 37 of predetermined width between axially spaced edges of the members through which light may be projected uniformly on a portion of the surface of the revolvable cylinder 14. The width of the projection slot may be increased or decreased to provide more or less light as required by the light-sensitive duplicating film.

A radiation source 16 such as a fluorescent lamp 41 and its associated driving unit is secured within the area defined by the opaque members 17 and 18, with the axis of the lamp 41 coincident with the axis of the cylinder 14. This type of light source is used to give uniform illumination on the surface of the revolvable cylinder along the length of the exposure slot 37.

A rectangular disc supporting bar 43 is positioned adjacent the cylinder 14 on the side opposite the projection slot 37. The surface of the disc supporting bar 43 which faces away from the revolvable cylinder 14 is formed with grooves 44 across its width and oblique to the longitudinal centerline, for example, at an angle of approximately 13.5° to a line normal to its longitudinal centerline, to position five grooves 44 in properly spaced relation to define separate paths for the original film past the duplicating station. Within each groove 44 is mounted an end of a rectangular disc retaining bar 46 the opposite end of which has a narrow slot 47 extending from said end to a circular hole 48 adapted to receive a bushing 49 journaling a pin 50 connecting axially spaced flanges 51 and 52, each pair of which form a pulley or disc 53 for the original film 9.

The five discs 53 illustrated in the drawing have the same effective diameter as the cylinder 14 and are, for example, each composed of two 4.25 inch (10.5 cm.) diameter flanges, when the cylinder 14 has a 4 inch (10 cm.) diameter, having central holes and a circumferential step 54, 0.125 inch (0.25 cm.) from their peripheries. A disc 53 is assembled by inserting the bushing 49 into the circular hole 48 in a disc retaining bar 46, aligning the central holes of the flanges 51 and 52 with the hole through the bushing 49 and press fitting the pin 50 through the flanges. When assembled the two flanges are spaced so that an original film 9 may fit between their peripheries and rest on the peripheral surface steps 54. An original film may, therefore, be supported and guided by each disc 53.

The disc steps 54 provide an effective pulley diameter of 4 inches (10 cm.) for travel of the original film which is the same as the diameter of the cylinder 14. The provision of the oblique grooves 44 in the disc supporting bar 43 positions the discs 53 in planes at an angle to the axis of the revolvable cylinder 14 such that the centerline of an original film 9 passing from one disc 53 to another around the cylinder maintains a horizontal path from one disc to the next adjacent disc. The film then makes surface contact with the revolvable cylinder 14 and moves across it in a path perpendicular to its axis on each pass around the revolvable cylinder 14 as the film progresses from disc to disc in a generally helical path up the cylinder disposing spaced successive portions of the original film 9 across the projection slot 37 simultaneously. One of the spaced successive portions of the original film is thus positioned across the projection slot 37 for each 360° coil of the generally helical guide path from one disc to the next adjacent disc around the cylinder 14.

Figure 4:
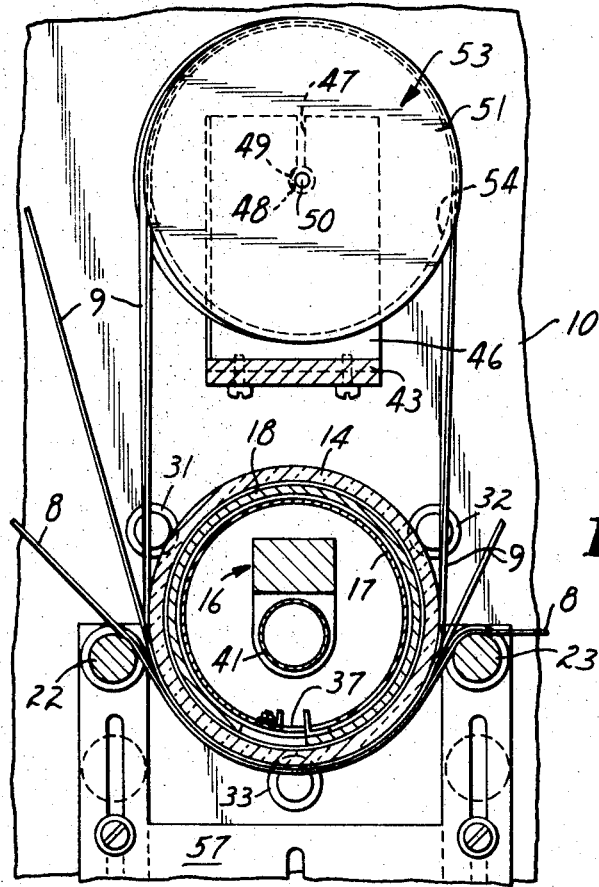
FIG. 4 is a fragmentary horizontal sectional view taken along line 4-4 of FIG. 2.
Figure 5:
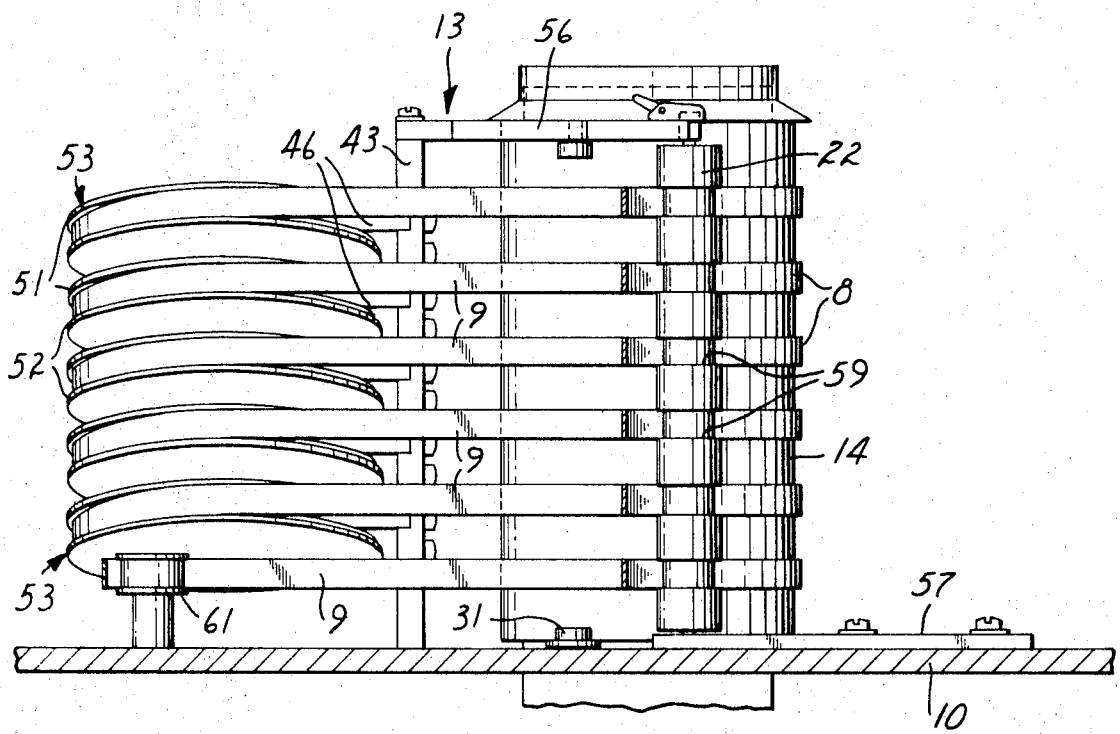
FIG. 5 is a fragmentary side elevational view taken along line 5-5 of FIG. 1.
Figure 6:
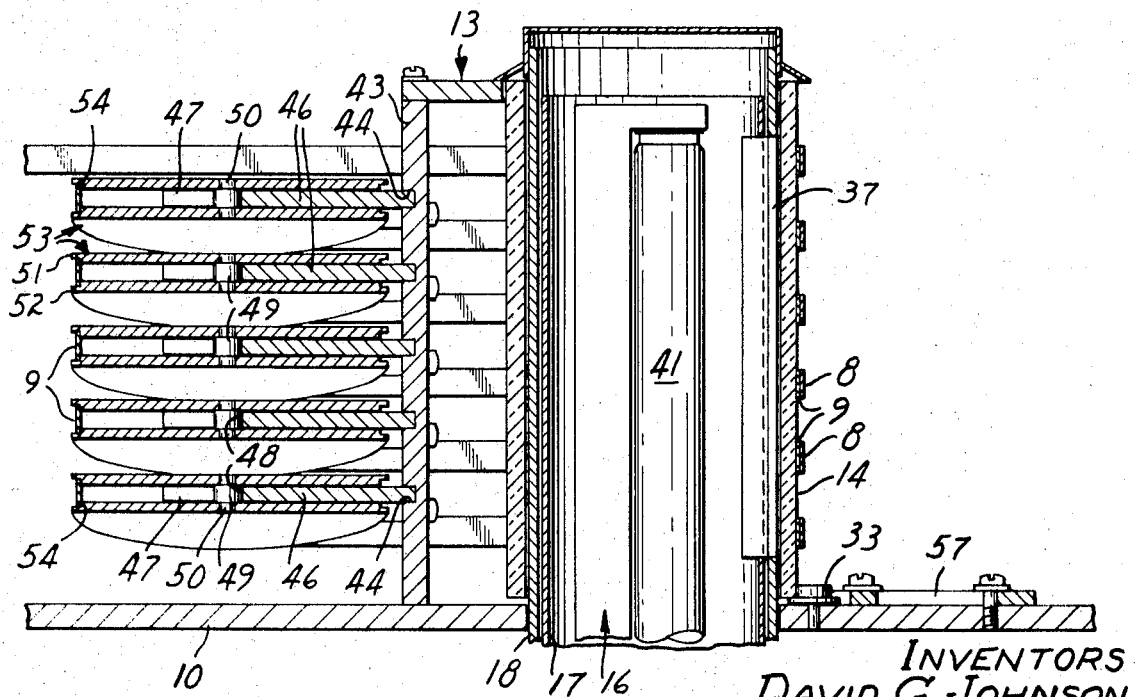
FIG. 6 is a fragmentary vertical sectional view taken along line 6-6 of FIG. 1.

Secured to the upper edge of the disc supporting bar 43 is a guide roller supporting member 56. This member has portions extending equally around both sides of the cylinder 14 but not contacting it for rotatably supporting the upper ends of the guide rollers 22 and 23. The guide rollers 22 and 23 are cantilever mounted and rotatably supported on a movable support plate 57. The plate 57 permits movement of the guide rollers 22 and 23 away from the cylinder 14 to the broken-line position shown in FIG. 4 to afford rapid threading of the films through the apparatus. Each of the guide rollers 22 and 23 have six circumferentially extending slots 59, of substantially the same width or axial extent as the transverse width of a duplicating film, to guide six duplicating films moving from the stack of supply reels 21 into contact with the original film 9 as it makes each pass across the projection slot 37. One slot 59 in each guide roller 22 and 23 is in vertical alignment with the path of the original film around the surface of the cylinder so that a duplicating film 8 extending from one guide roller to the other will register with and make intimate surface contact with the original film while the original film is in surface contact with the revolvable cylinder 14 as it is moved past the projection slot 37.

Alternatively, the guide means for registering the duplicating films and the original film during each pass of the latter past the duplicating station may include guide means positioned adjacent the cylinder 14 to contact both the original and duplicating film on each side of the duplicating station. For example, these guide means may include additional rollers similar to the rollers 22 and 23 positioned within the path of the original film and between the rollers 22 and 23 and each adjacent side of the cylinder 14. The additional rollers would then effectively increase the diameter of the cylinder and correspondingly larger guide discs 53 would be required.

Further, the rollers 22 and 23 could be positioned to effectively wrap the duplicating films about a greater extent of the cylinder and thus contact both the original and duplicating films to afford registration. Thus other forms of guides are practical.

The original film supply reel 11 is positioned on one side of and behind the duplicating station 13 on the same vertical level as the lowest slots in the guide rollers 22 and 23 so that the original film can travel horizontally from the supply reel 11, around the revolvable cylinder 14 and unto the lowest disc 53. An additional guide roll 61 is positioned between the original supply reel 11 and the cylinder 14 so that the original film 9 will pass between the guide roller 22 and the cylinder. The original supply reel 11 is supported by a rotatable spindle connected with an AC gearmotor 34 having a DC potential on it to act as a dynamic brake.

The original film takeup reel 12 is spaced from the supply reel 11 on the same side of the duplicating station and on the same vertical level as the uppermost slots in the guide rollers 22 and 23 so that the original film 9 can travel horizontally off the uppermost disc 53, around the revolvable cylinder 14 and onto the takeup reel 12. The original takeup reel 12 is supported on a spindle driven by suitable means such as an AC electric gearmotor 35 with just sufficient torque to maintain a constant tension in the original film at all times.

Adjacent the original film supply reel 11 is positioned a stack of six vertically coaxial duplicating film supply reels 21. The stack may be covered with a protective cap 62 having a slot 63 permitting withdrawal of the films. The reels 21 in the stack are positioned so that one duplicating film is at each of the vertical levels of the circumferential slots 59 in the guide rollers 22 and 23. The stack of supply reels 21 is mounted on a fixed shaft with braking or friction discs disposed between the reels 21 to keep the duplicating films 8 under equal tension as they are pulled from the reels. The reels 21 are otherwise independently mounted so the duplicating films may be pulled from the supply reels at equal linear velocities even when the diameters of the wound film on the reels are different.

The film processor 24 is aligned with the periphery of guide rollers 22 and 23, and when the duplicating films are light-sensitive and heat-developable the processor, as illustrated, subjects the duplicating films to heat sufficient to cause development of the image as the films are moved through the processor. An example of the type of duplicating film contemplated is disclosed in U.S. application Ser. No. 693,714, now U.S. Pat. No. 3,457,075 filed Dec. 27, 1967 as a light-sensitive heat-developable sheet material containing a photosensitive silver halide in catalytic association with an image-forming oxidation-reduction reaction mixture of organic salt and reducing agent. The heat processor illustrated has a narrow longitudinal opening 25 in the frame through which the heat-developable duplicating films 8 may pass side by side between chambers 64 through which air heated by coils 66 is forced by fans 67 onto opposite faces of the films.

In conjunction with the heat processor, a freely rotatable cylindrical cooling guide 26, through which cooling air flows, is positioned to cool the duplicating films after they have passed through the processor to prevent overdeveloping. The periphery of the cooling guide 26 is aligned with the guide roller 23 to provide a path for the duplicating films from the guide roller 23 through the processor 24 so that the duplicating films do not contact any surfaces of the heat processor.

The drive capstan 27, driven from a suitable motor 36, which may also serve as a heat sink to cool the films, pulls the duplicating films 8 from the duplicating film supply reels 21 at equal linear velocities and the original film 9 is forced to move at the same linear velocity because of the intimate contact between the duplicating films 8 and the original film 9 on the surface of the revolvable cylinder 14. The single capstan 27 is the only film driving member and like the guide 26 has an axial length corresponding to the guides 22 and 23 to contact the duplicating films. The guide 26 and capstan 27 are supported at one end rotatably on the deck 10 to permit easy threading.

After the duplicating films have passed the capstan they are moved past a viewing station 28 where they are moved past a housing 68 for a light source which will permit cursory visual inspection of the copy films to check development, content, etc. From the viewing station 28 the films 8 move past a guide 71 and are wound on individual takeup reels 29 in a stack and supported by a driven spindle. The drive for the takeup reels 29 overdrive each reel independently to maintain tension in the duplicating films and each reel may thus rotate independently in case the diameters of the wound film on the reels are different.

In operation, the original film 9 is initially threaded from its supply reel 11 to its takeup reel 12 around the revolvable cylinder 14 and the discs 53 in a generally helical path to position spaced successive portions of the film 9 across the exposure slot 37 simultaneously. The duplicating films 8 are threaded from their supply reels 21, between the guide roller 22 and the cylinder 14, to make intimate contact with the original film 9 in associated axially spaced positions at the duplicating station 13. The films 8 are then guided around roller 23, through processor 24, around guide 26, capstan 27, guide 71 onto their respective takeup reels 29. The rollers 22 and 23 are moved to the solid line positions indicated and the films are all tightened. Operation of the capstan 27 moves the films and as the duplicating films move by the projection slot 37 in intimate contact with the original film they are exposed. They then pass around the guide roller 23 and are separated from the original film and are guided through the heat processor 24. Each duplicating film is developed in the processor to produce visible images thereon corresponding to the images on the original film.

The duplicate films pass from the heat processor to the cooling guide 26 and to the capstan 27 where they are coded to prevent overdeveloping. Finally, the duplicate films pass the viewing station and are wound onto the driven takeup reels 29.

The discs 53 are positioned such that their peripheral film-supporting edges, which are disposed to lie on a line tangential to the cylinder 14, are disposed in the different film paths about the cylinder 14. Also, adjacent discs have edges disposed in a common path. This relationship assures uniform contact between the original film and the cylinder 14 on each pass about the cylinder, making the guiding of the film easier and avoiding uneven tension along the edges.

Having thus described the present invention with reference to a preferred embodiment, it will be understood that minor modifications may be made therein without departing from the spirit and scope of the invention.

What we claim is:

1. Apparatus for duplicating graphic information contained on an original web comprising:
    means defining an elongated duplicating station at which an image on a said original web may be imparted to a duplicating web,
    means for guiding said original web past said duplicating station in a generally helical path progressing in a direction parallel to the longitudinal centerline of said duplicating station to position a plurality of spaced successive portions of said original web at said duplicating station simultaneously, one said successive portion of said original web being positioned at said duplicating station for each coil of said generally helical path,
    guiding means for a plurality of duplicating webs to place one duplicating web in intimate contact with each said successive portion of the original web at said duplicating station, and
    drive means for moving said duplicating webs and said original web to progressively impart information on a said original web to said duplicating webs.

2. Apparatus as recited in claim 1 wherein said means for guiding said original web comprises:
    a revolvable cylinder disposed adjacent said duplication station with its axis parallel to the longitudinal centerline of said duplicating station,
    a plurality of discs each having a circumferential slot of a width to guide said original web, and
    means for mounting said discs in parallel planes for rotation about their axes with their centers on a line spaced from and parallel to the axis of said cylinder and with the planes of said discs inclined to the axis of said cylinder,
    whereby said original web passes said duplicating station each time it moves from a said disc, around said cylinder and onto the next adjacent disc, and it is advanced along the length of said cylinder on each successive pass around said cylinder.

3. Apparatus as recited in claim 2, wherein the successive passes of said original web contacting the surface of the cylinder are in parallel paths perpendicular to the axis of said cylinder, and each disc has edges tangent with the periphery of the cylinder disposed in adjacent parallel paths of said original web.

4. Apparatus as recited in claim 3, wherein said means mounting said discs further positions said discs with the line connecting the centers of said discs in a plane through the axis of said cylinder and the longitudinal centerline of said duplicating station.

5. Apparatus as recited in claim 4, wherein said guiding means for a plurality of duplicating webs comprises a pair of rollers positioned with their axes parallel to the axis of said cylinder and lying in a plane perpendicular to the plane containing the line through the centers of said discs and the axis of said cylinder, said plane containing the axes of said rollers cutting said cylinder between the axis of said cylinder and the periphery of said cylinder adjacent said duplicating station, each said roller having a plurality of circumferential slots of a width to guide a said duplicating web, one said slot of each said roller aligned with each of the passes of said original web across the surface of said cylinder, whereby a said duplicating web passing between aligned slots in said rollers is registered and placed in intimate contact with a portion of said original web contacting the surface of said cylinder.

6. Apparatus for making multiple copies of graphic information contained on an original photographic film on light-sensitive films substantially simultaneously comprising:
    means defining an elongated duplicating station having a light source from which light may be projected through the transparent areas of said original film onto a said light-sensitive film,
    means for supporting a supply of original film,
    means for taking up said original film,
    means for guiding said original film from said supply supporting means to said takeup means past said duplicating station in a generally helical path progressing in a direction parallel to the longitudinal centerline of said duplicating station to position a plurality of spaced successive portions of said original web at said duplicating station simultaneously, one said successive portion of said original web being positioned at said duplicating station for each coil of said generally helical path,
    means for supporting a plurality of light-sensitive films,
    means for guiding each light-sensitive film from said supporting means to place one light-sensitive film in intimate contact with each said successive portion of said original film in advance of said duplicating station,
    means for separating each said light-sensitive film from said original film after travel past said duplicating station, and
    means for taking up each said light-sensitive film.

7. Apparatus as recited in claim 6 wherein said means for guiding said original film comprises:
    a revolvable cylinder disposed adjacent said duplication station with its axis parallel to the longitudinal centerline of said duplicating station,
    a plurality of discs each having a circumferential slot of a width to guide said original film, and
    means for mounting said discs in parallel planes for rotation about their axes with their centers on a line spaced from and parallel to the axis of said cylinder and with the planes of said discs inclined to the axis of said cylinder,
    whereby said original film passes said duplicating station each time it moves from a said disc, around said cylinder and onto the next adjacent disc and it is advanced along the length of said cylinder on each successive pass around said cylinder.

8. Apparatus as recited in claim 7, wherein the successive passes of said original film contacting the surface of the cylinder are in parallel paths perpendicular to the axis of said cylinder, and each disc has edges tangent with the periphery of the cylinder disposed in adjacent parallel paths of said original film.

9. Apparatus as recited in claim 8, wherein said means mounting said discs further positions said discs with the line connecting the centers of said discs in a plane through the axis of said cylinder and the longitudinal centerline of said duplicating station.

10. Apparatus as recited in claim 9 wherein said means for guiding a plurality of light-sensitive films comprises a pair of rollers positioned with their axes parallel to the axis of said cylinder and lying in a plane perpendicular to the plane containing the line through the centers of said discs and the axis of said cylinder, said plane containing the axes of said rollers cutting said cylinder between the axis of said cylinder and the periphery of said cylinder adjacent said duplicating station, each said roller having a plurality of circumferential slots of a width to guide one said light-sensitive film into alignment with each of the passes of said original film across the surface of said cylinder, whereby a said light-sensitive film passing between aligned slots in said rollers is in intimate contact with the original film on a pass across the surface of said cylinder.

11. Apparatus as recited in claim 10 wherein said means defining an elongated duplicating station comprises a fixed hollow opaque cylinder having a narrow slit in its periphery and a light source along the axis of said opaque cylinder, said opaque cylinder being positioned within said revolvable cylinder, which is hollow and transparent, with the axes of said cylinders coincident and the centerline of the slit in said opaque cylinder in a plane through the line connecting the centers of said discs and the axis of said revolvable cylinder, whereby light is projected through the transparent areas of said original film onto said light-sensitive film when said original film and said light-sensitive films are in intimate contact on the surface of said revolvable cylinder thereby exposing portions of said light-sensitive films.

12. Apparatus as recited in claim 11 including a heat processor between said means separating each said light-sensitive film from said original film and said means for taking up each said light-sensitive film whereby exposed light-sensitive heating-developable films may be developed before proceeding to said takeup means.

13. Apparatus as recited in claim 12 including means for cooling said light-sensitive heat-developable films positioned between said heat processor and said takeup means to prevent overdeveloping of said light-sensitive heat-developable films.

14. Apparatus as recited in claim 13, wherein said means for taking up each said light-sensitive film comprises capstan drive means which drives said plurality of light-sensitive films at substantially equal linear velocities from said means for supporting a plurality of light-sensitive films, and a plurality of driven takeup reels each affording rewind of a developed light-sensitive heat-developable film for storage following said capstan drive means.

15. Apparatus as recited in claim 14, wherein said means for taking up original film comprises an original takeup reel, means for driving said takeup reel, and means for braking said means for supporting a supply of said original film and said takeup reel to keep said original film under tension, whereby movement of said light-sensitive films in intimate contact with said original film across the surface of said revolvable cylinder causes said original film to move at the same linear velocity said light-sensitive films from said means supporting a supply of said original film to said original takeup reel.

UNITED STATES PATENT OFFICE
CERTIFICATE OF CORRECTION

Patent No. 3,582,207          Dated June 1, 1971

Inventor(s)  David G. Johnson and Arthur W. Kutchera

It is certified that error appears in the above-identified patent and that said Letters Patent are hereby corrected as shown below:

Column 1, line 56, after "duplicating" insert -- station --.

Column 3, line 12, after "film" insert -- 9 --; and line 43, after "and" insert -- the.

Column 8, line 1, change "heating" to -- heat --; and line 22, after "velocity" insert -- as --.

Signed and sealed this 22nd day of February 1972.

(SEAL)
Attest:

EDWARD M. FLETCHER, JR.      ROBERT GOTTSCHALK
Attesting Officer           Commissioner of Patents